(12) United States Patent
Smithson et al.

(10) Patent No.: US 6,224,008 B1
(45) Date of Patent: May 1, 2001

(54) SEAT BELT RETRACTOR

(75) Inventors: Alan George Smithson; Howard James Foster, both of Carlisle (GB); Jürgen Arold, Burgobarbach (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/388,790

(22) Filed: Sep. 2, 1999

(30) Foreign Application Priority Data

Jan. 4, 1999 (GB) .................................................. 9900072

(51) Int. Cl.⁷ .................................................. B60R 22/34
(52) U.S. Cl. ........................... 242/374; 280/806; 280/807
(58) Field of Search ............................ 242/374; 280/806, 280/807; 297/478, 480

(56) References Cited

U.S. PATENT DOCUMENTS

| | | | |
|---|---|---|---|
| 4,372,501 | 2/1983 | Inukai | 242/107 |
| 5,397,075 | 3/1995 | Behr | 242/374 |

FOREIGN PATENT DOCUMENTS

| | | | |
|---|---|---|---|
| 0673811A | 9/1995 | (EP) . | |
| 2332397A | 6/1999 | (GB) . | |
| 10067300 | 3/1998 | (JP) . | |

Primary Examiner—John Q. Nguyen
(74) Attorney, Agent, or Firm—Lonnie Drayer

(57) ABSTRACT

A seat belt retractor has a spool having seat belt webbing wound thereon mounted for rotation in a frame. A toothed ratchet wheel is connected to the spool and rotates therewith. The retractor has a crash sensor. A locking pawl is arranged to be pivotable from a first position in which it is spaced from the ratchet wheel to a second position in which it engages with the ratchet wheel to lock the spool against rotation, in response to activation of the crash sensor. A pretensioner is responsive to the crash sensor to rapidly rewind webbing onto the spool. A venting arrangement for the pretensioner includes a chamber having an inside side wall and an inside wall. A vent hole is formed in the side of the chamber with a seal for the vent hole. An axially slidable member is mounted in the chamber and biased away from one end of the chamber. The slidable member is connected to the locking pawl, so that it slides in the chamber when the locking pawl pivots. Seals are arranged between the slidable member and the inside wall of the chamber during normal operation of the retractor, and when the locking pawl is in the first position to lie one on each side of the vent hole and to lie both on the same side of the vent hole when the locking pawl is in the second position.

18 Claims, 6 Drawing Sheets

SEAT BELT RETRACTOR

FIELD OF THE INVENTION

The present invention relates to a retractor for a seat belt retractor, and particularly to a seat belt retractor having a pretensioner.

BACKGROUND OF THE INVENTION

Pretensioners are used in modern vehicle seat belt systems to rapidly draw in a length of belt webbing in the event of a crash and take up slack in the belt. This pretensioning action minimizes forward movement of the restrained vehicle occupant and more correctly positions the vehicle occupant in the vehicle seat to maximize the effect of a secondary safety restraint, such as an airbag.

Vehicle manufacturers prefer pretensioners to be as small as possible and this has led, in recent years, to the development of various forms of so-called compact pretensioners. In general a compact pretensioner works without the need for a clutch mechanism to connect it to the retractor.

In addition, modern seat belt systems often incorporate load limiting features to reduce the detrimental effect of the force exerted on the vehicle occupant by the restraining seat belt itself. It is desirable to lock the seat belt and pretension it at the very beginning of a crash, as the crash force is rising, but to then allow a small amount of payout of the seat belt, at a particular controlled load at the peak of the crash force, to reduce the peak load felt by the vehicle occupant.

SUMMARY OF THE INVENTION

The present invention provides an improved pretensioner for a seat belt retractor, which is suitable for seat belt retractors with load limiting features.

More particularly, the present invention can provide a venting system for a compact pretensioner.

According to the present invention there is provided a seat belt retractor comprising: a spool having seat belt webbing wound thereupon and being mounted for rotation in a frame; a toothed ratchet wheel connected to the spool to rotate therewith; a crash sensor; a locking pawl arranged to be pivotable from a first position in which it is spaced from the ratchet wheel to a second position in which it engages with the ratchet wheel to lock the spool against rotation, in response to activation of the crash sensor; a pretensioner arranged to be responsive to the crash sensor to rapidly rewind webbing onto the spool; a venting arrangement for the pretensioner, the venting arrangement comprising: a chamber having an inside side wall and an inside wall; a vent hole formed in the side of the chamber; a seal for the vent hole; an axially slidable member mounted in the chamber and biased away from one end of the chamber by a resilient member; the slidable member being operatively connected to the locking pawl, so that the member slides in the chamber, against the resilient bias, when the locking pawl pivots from the first to the second position and; at least two spaced seals between the slidable member and the inside wall of the chamber arranged during normal operation of the retractor, when the locking pawl is in the first position to lie one on each side of the vent hole and to lie both on the same side of the vent hole when the locking pawl is in the second position.

Preferably the chamber takes a cylindrical form as the slidable member is a piston. The vent hole seal may be pressure or heat rupturable. The resilient member may be a compression coil spring connected between an end wall of the chamber and fitting in a recess in one end of the piston.

The chamber may be located within housing and seals provided between the outside walls of the chamber and the inside walls of the housing. An opening in the side wall of the housing is preferably aligned with the vent hole in the chamber wall and is connected to receive gas under pressure, from the pretensioner. In one embodiment this opening in the housing tapers in an inward direction so as to concentrate the pressure on the vent hole seal.

In one embodiment the slidable piston is connected mechanically, e.g. by a rigid shaft, but this connection could be electrical or electronic.

DETAILED DESCRIPTION OF THE INVENTION

Figure 1:
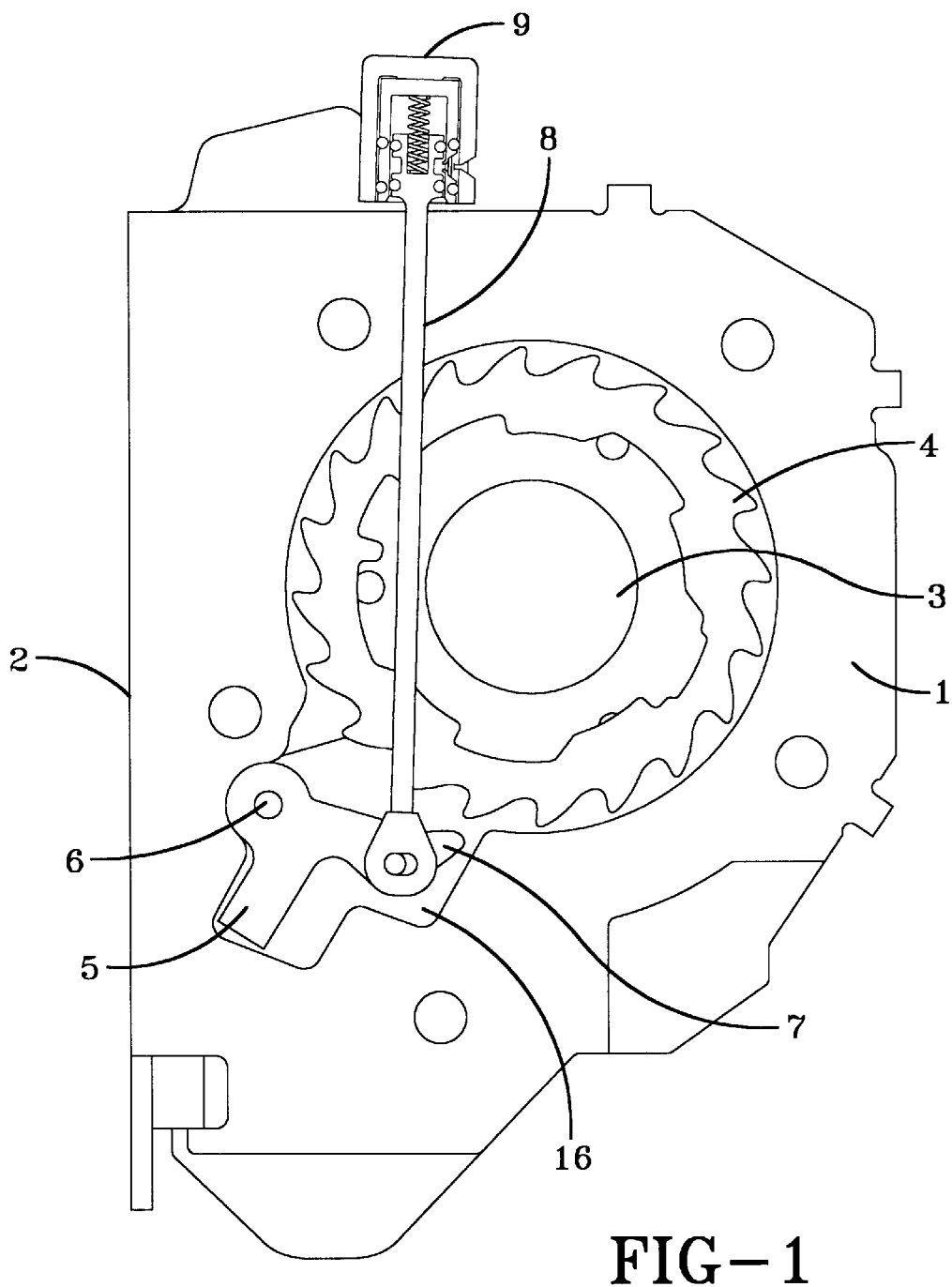
FIG. 1 is a cross-sectional view of a seat belt retractor of the present invention in an unlocked position.
Figure 6:
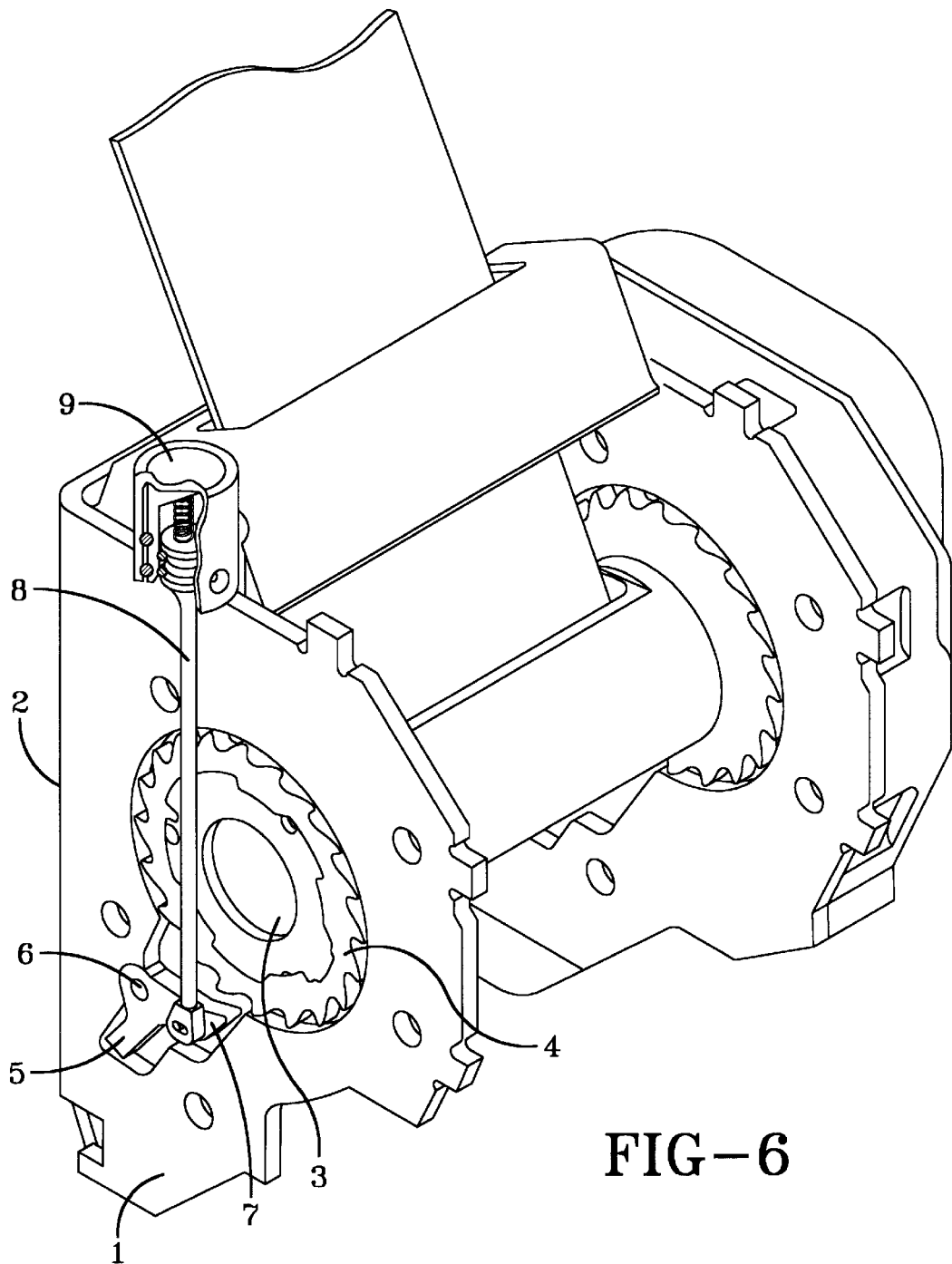
FIG. 6 is a perspective view of the seat belt retractor of FIGS. 1 and 2.

In FIGS. 1 and 6 a seat belt retractor frame 1 is shown mounted at its' back face 2 to a fixed part of the vehicle, e.g. one of the pillars of the vehicle body. Seat belt retractors are well known and many examples of suitable retractors are found in the prior art. Seat belt webbing is wound on a central spool 3 which is mounted for rotation in frame 1, under the bias of a clock spring, to pay out or to wind in seat belt webbing according to the circumstances. Connected to the spool 3 is a toothed ratchet wheel 4. A locking pawl 5 is pivotable about point 6 so that a tooth 7 may be brought into contact with the teeth on the ratchet wheel 4 to lock the spool 3 against rotation and thus against further pay out of the webbing.

Attached to the locking tooth end of the pawl 5 is a shaft 8 that is connected to a venting arrangement 9 for a compact pretensioner (not shown). In FIG. 1 the locking tooth 7 of the pawl 5 is shown with a clearance between it and the teeth of the latch wheel 4 and thus the spool 3 is free to rotate in either direction. This is the position during normal, i.e. non-emergency operation of the retractor.

Figure 2:
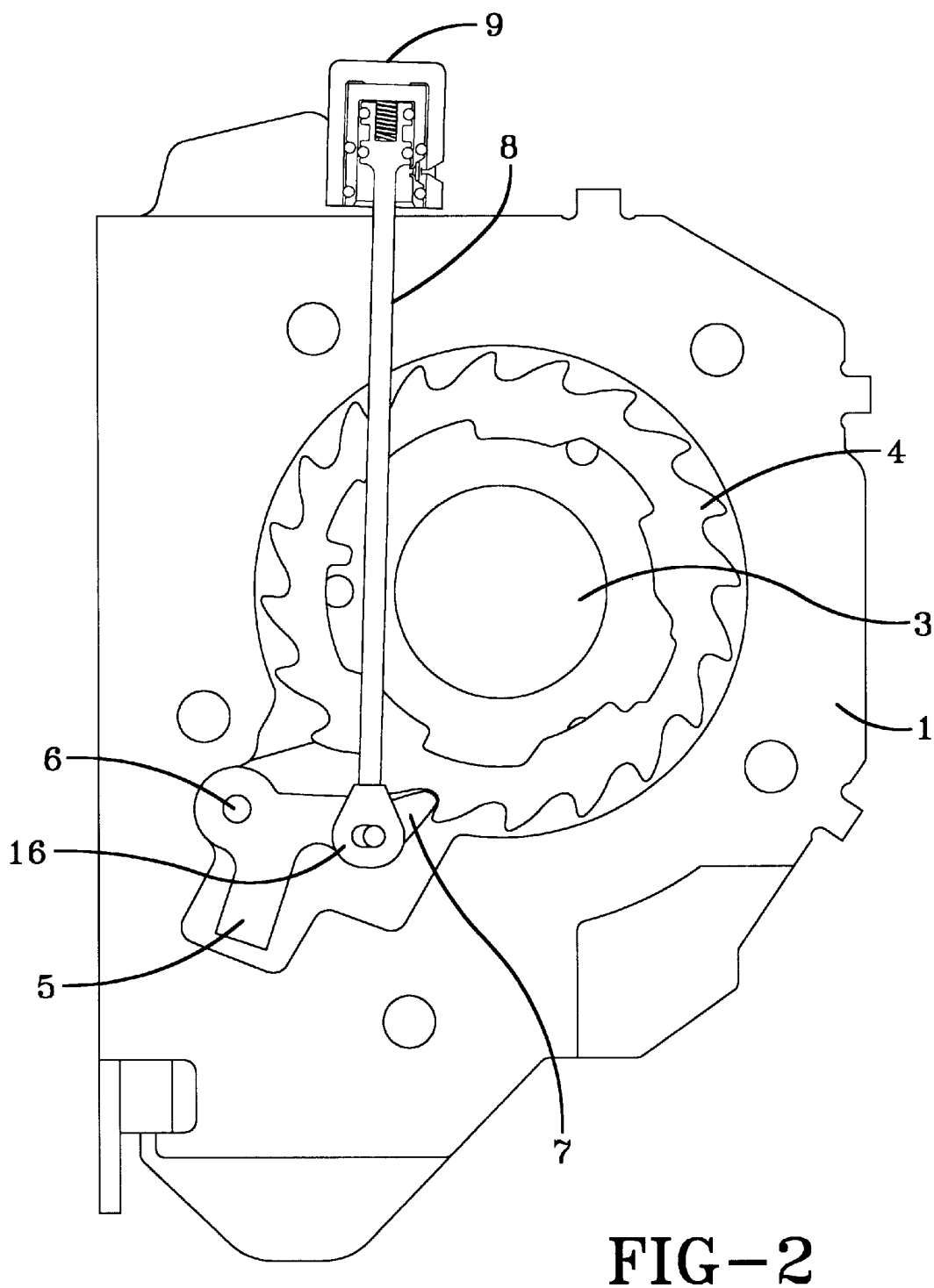
FIG. 2 is a cross-sectional view of the seat belt retractor of FIG. 1 in a locked position.

In FIG. 2, like parts are denoted by like reference numerals. In FIG. 2 the pawl 5 has been moved, either in response to a crash sensor, or in response to a webbing sensor (examples of which are well known in the art). Thus the pawl 5 is rotated about point 6 and the locking tooth 7 is bought into engagement with teeth on the ratchet wheel 4.

In FIG. 2 since the shaft 8 is raised with the locking tooth 7, the internal arrangement of the vent 9 has changed and this will be described later with reference to FIGS. 3 to 5.

The shaft 8 is connected at its lower end to the locking pawl 7 by a pivotal joint 20 and extends upwardly through the retractor frame 1. At its upper end the shaft 8 is fatter and splays outwardly to form a piston 22. As can be seen more clearly in FIGS. 3 to 5 the piston end of shaft 8 has a recess 21 in which is located a spring 9 which biases the shaft 8 downwards towards the retractor frame 1. The piston 22 is received in the chamber 10 and is sealed against the sides of the chamber 10 by two o-ring seals 11, spaced one on each side of a vent hole 13. The vent hole 13 is closed by a vent seal 24 that is a weakened part or a membrane that is rupturable by pressure and/or heat from the pretensioner gasses. The chamber 10 is located in a housing 14. An opening 23 in the side of the housing 14 is aligned with the vent hole 13 and is connected to receive venting gas under pressure from the pretensioner (not shown).

Another pair of o-ring seals 12 seal either side of the opening 23. The seals may be formed of plastic, for example of the propriety material known by the trademark PEBAX.

The operation of this venting system will now be described.

Figure 3:
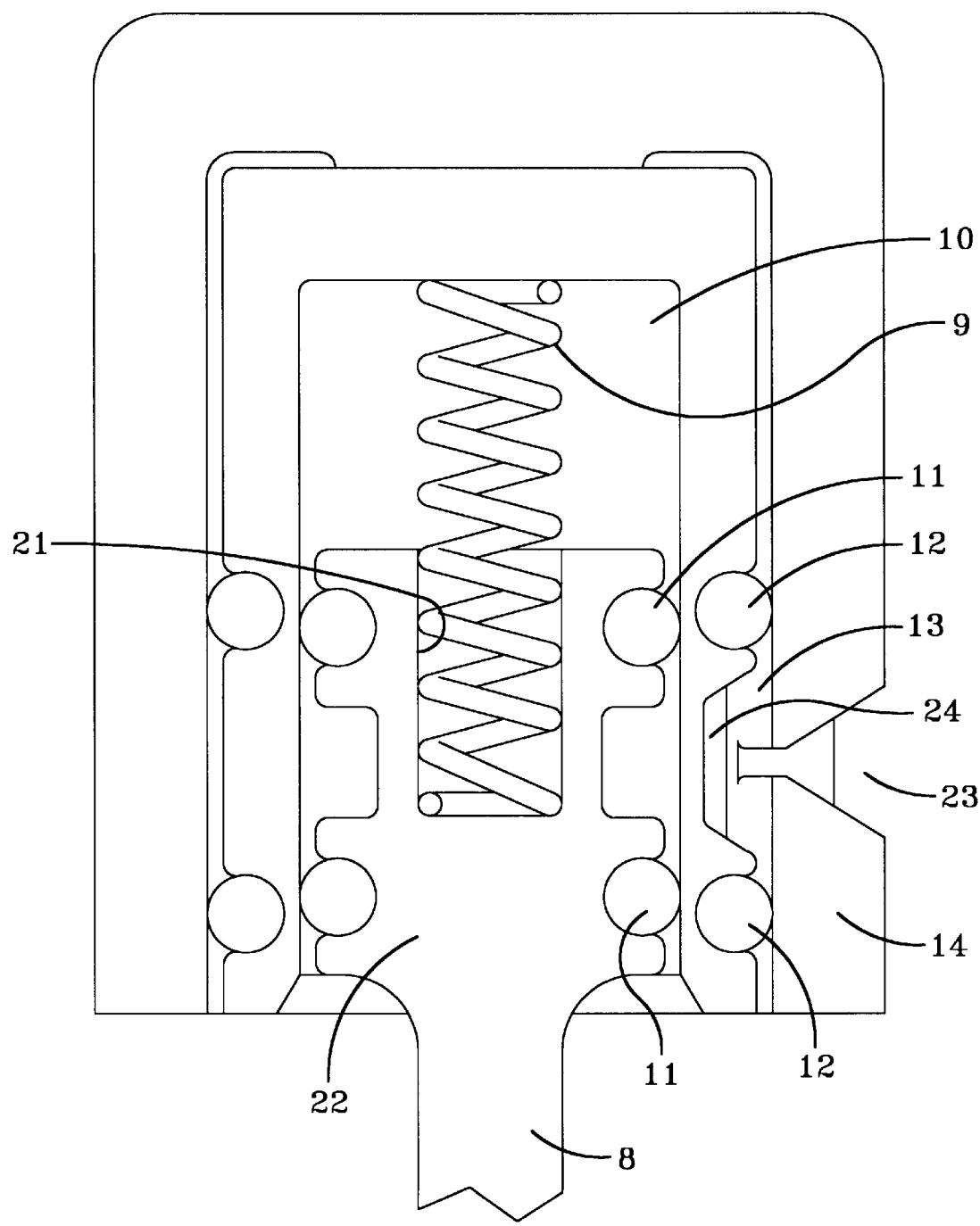
FIGS. 3 to 5 show, in enlarged views, a part of the seat belt retractor of FIGS. 1 and 2 and illustrate the sequence of events in its' operation.

In FIG. 3 the vent is closed and the retractor is operating normally (i.e. the pretensioner is not ignited so the pressure is normal). In this condition the vent seal 24 is intact and the piston 22 on the shaft 8 seats comfortably so no venting occurs.

Figure 4:
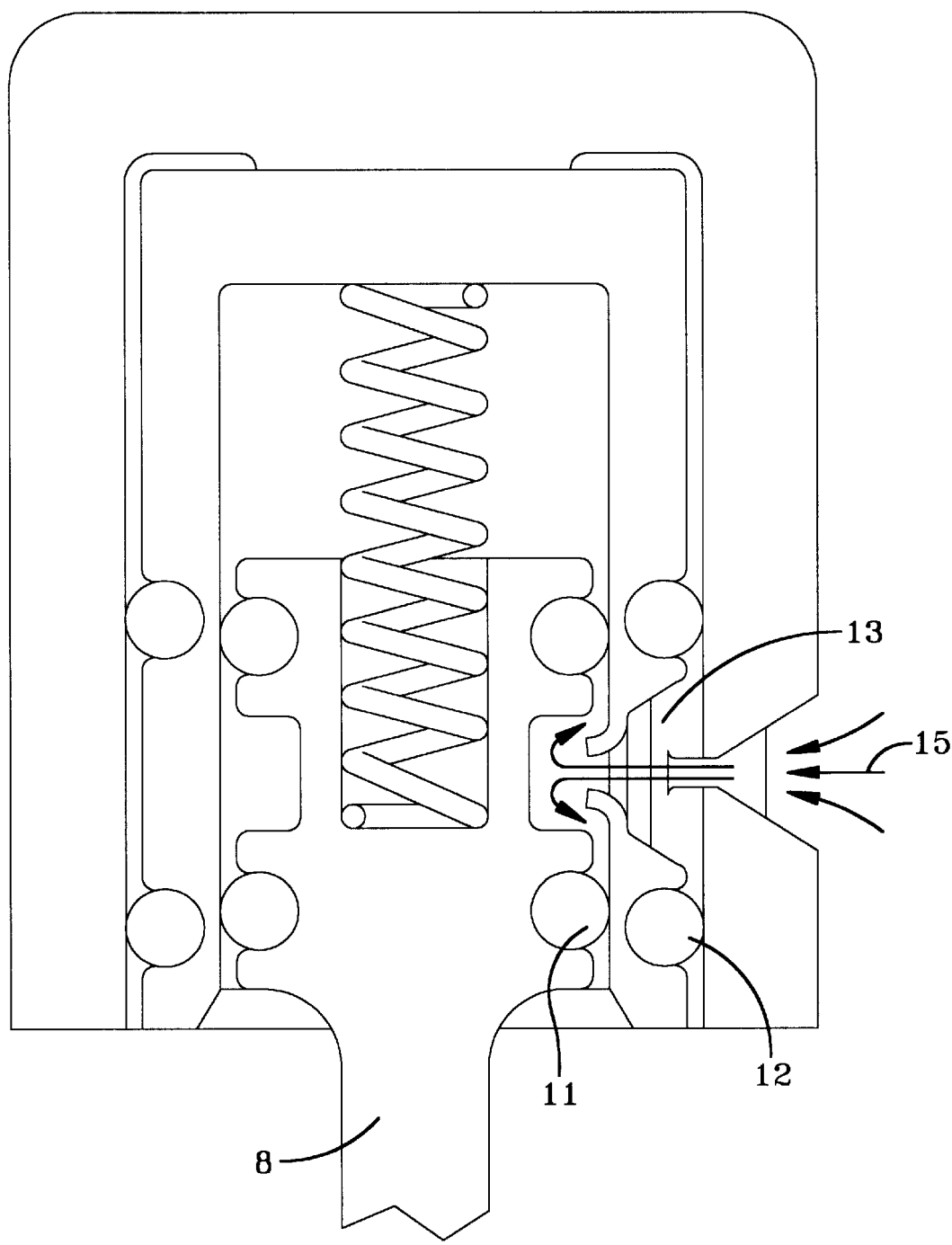

In FIG. 4 the pretensioner has been fired and the pretensioner pressure indicated by arrows 15, increases, passing through tapering opening 23 and impinging on and rupturing the vent seal 24 opening the vent hole 13. However the vent effectively remains closed because of the widened part of shaft 8 blocking the exit by means of the lower o-ring seal 11. No translation movement of the piston will occur since the upper seal 11 balances the pressure force on the piston.

Figure 5:
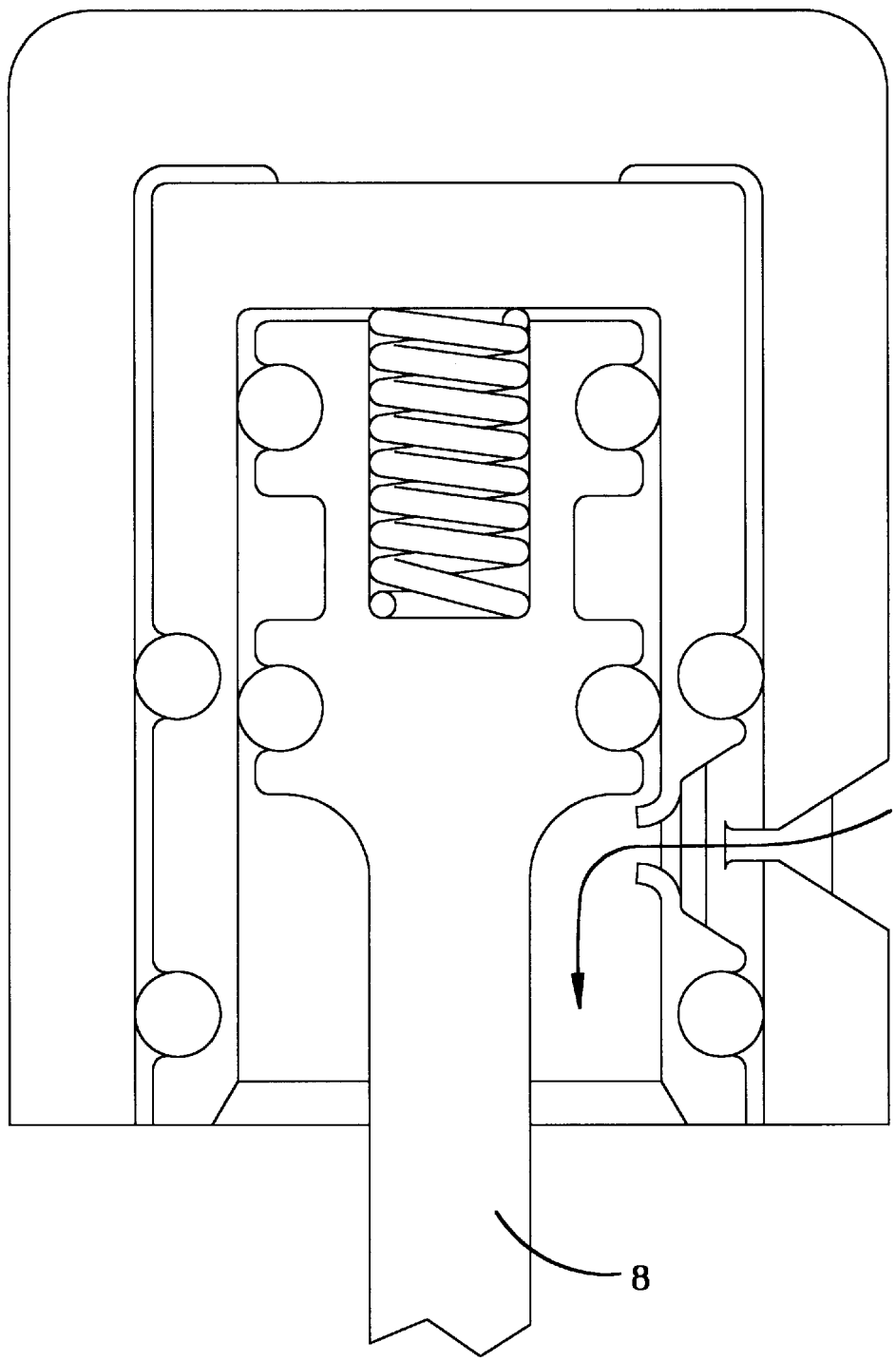

In FIG. 5 the pretensioning is complete and the retractor has locked by means of a locking tooth 7 engaging the teeth on ratchet wheel 4. In moving up to engage the ratchet wheel teeth, the pawl 5 also moves the shaft 8 via linkage 16 and the upper widened part of the shaft 8 is unseated. The vent seal 24 having being ruptured, gas escapes into the chamber 10 and subsequently out to the atmosphere, since it is no longer blocked by the lower o-ring seal 11.

The present invention has advantages since the venting only comes into operation after pretensioning when the retractor is fully locked. Hence, before and during pretensioning a good seal is maintained to maximize the pretensioning gas pressure and hence the pretensioning effect. However after pretensioning, when the retractor locks, the pretensioner is automatically vented. For embodiments with load limiting the pretensioner can, if necessary, be back driven during load limiting, without any increase in the belt load due to residual pressure remaining within the pretensioner.

The normal seal of the vent hole in normal operation also protects the pretensioner from the ingress of water, dust and other foreign substances.

The second set of o-ring seals 12 and the upper o-ring 11 helps prevent movement of parts as a result of the gas pressure from the pretensioner, and avoids increasing the activation load on the lockbar as a result of the gas pressure.

Many changes and modifications in the above described embodiments of the invention can, of course, be carried out without departing from the scope thereof. Accordingly, that scope is intended to be limited only by the scope of the appended claims.

We claim:

1. A seat belt retractor comprising:
   a spool having seat belt webbing wound thereon and being mounted for rotation in a frame;
   a toothed ratchet wheel connected to the spool to rotate therewith;
   a crash sensor;
   a locking pawl arranged to be pivotable from a first position in which the pawl is spaced from the ratchet wheel to a second position in which the pawl engages with the ratchet wheel to lock the spool against rotation, in response to activation of the crash sensor;
   a pretensioner arranged to be responsive to the crash sensor to rapidly rewind webbing onto the spool;
   a venting arrangement for the pretensioner, the venting arrangement comprising:
   a chamber having an inside wall;
   a vent hole formed in the side of the chamber;
   a seal for the vent hole;
   an axially slidable member mounted in the chamber and biased away from one end of the chamber by a resilient member, the slidable member being operatively connected to the locking pawl so that the slidable member slides in the chamber, against the bias, when the locking pawl pivots from the first to the second position and;
   at least two spaced seals disposed between the slidable member and the inside wall of the chamber arranged during normal operation of the retractor, when the locking pawl is in the first position to lie one on each side of the vent hole and to lie both on the same side of the vent hole when the locking pawl is in the second position.

2. The seat belt retractor according to claim 1 wherein the chamber is cylindrical and the slidable member is a piston.

3. The seat belt retractor according to claim 2 wherein the seal for the vent hole is rupturable by a hot gas.

4. The seat belt retractor according to claim 2 wherein the pretensioner is a compact pretensioner.

5. The seat belt retractor according to claim 2 wherein the seal for the vent hole is rupturable by gas pressure.

6. The seat belt retractor according to claim 2 further comprising an external housing adjacent the chamber wall with an opening aligned with the vent hole.

7. The seat belt retractor according to claim 6 wherein a seal between the housing and the chamber outer wall comprises two ring seals spaced one on each side of the vent hole, and the opening.

8. The seat belt retractor according to claim 1 wherein the seal for the vent hole is rupturable by a hot gas.

9. The seat belt retractor according to claim 1 wherein the pretensioner is a compact pretensioner.

10. The seat belt retractor according to claim 9 herein the seal for the vent hole is rupturably by a hot gas.

11. The seat belt retractor according to claim 9 wherein the seal for the vent hole is rupturable by gas pressure.

12. The seat belt retractor according to claim 9 further comprising an external housing adjacent the chamber wall with an opening aligned with the vent hole.

13. The seat belt retractor according to claim 12 wherein a seal between the housing and the chamber outer wall comprises two ring seals spaced one on each side of the vent hole, and the opening.

14. The seat belt retractor according to claim 1 wherein the seal for the vent hole is rupturable by gas pressure.

15. The seat belt retractor according to claim 1 further comprising an external housing adjacent the chamber wall with an opening aligned with the vent hole.

16. The seat belt retractor according to claim 15 wherein a seal between the housing and the chamber outer wall comprises two ring seals spaced one on each side of the vent hole, and the opening.

17. The seat belt retractor according to claim 1 wherein the resilient member is a coil spring connected between the slidable member and the chamber.

18. The seat belt retractor according to claim 17 wherein the slidable member comprises a recess for holding the spring.

* * * * *